Sept. 20, 1966    G. D. PEVERLEY    3,273,958
PROCESS FOR THE PREPARATION OF SODA ASH
Filed Nov. 27, 1962    2 Sheets-Sheet 2
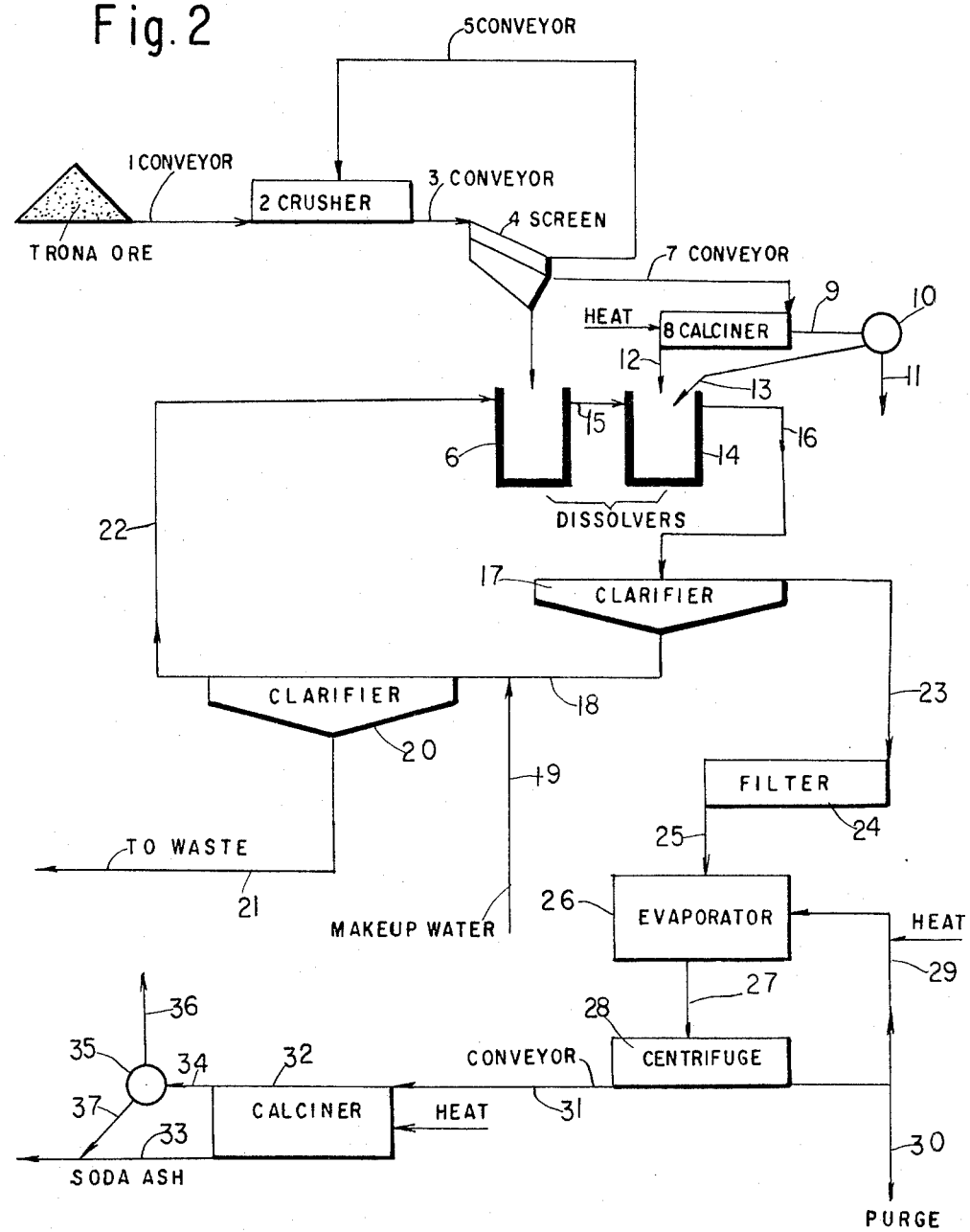
INVENTOR
GUY D. PEVERLEY
BY Hammond & Littell
ATTORNEYS United States Patent Office 3,273,958
Patented Sept. 20, 1966

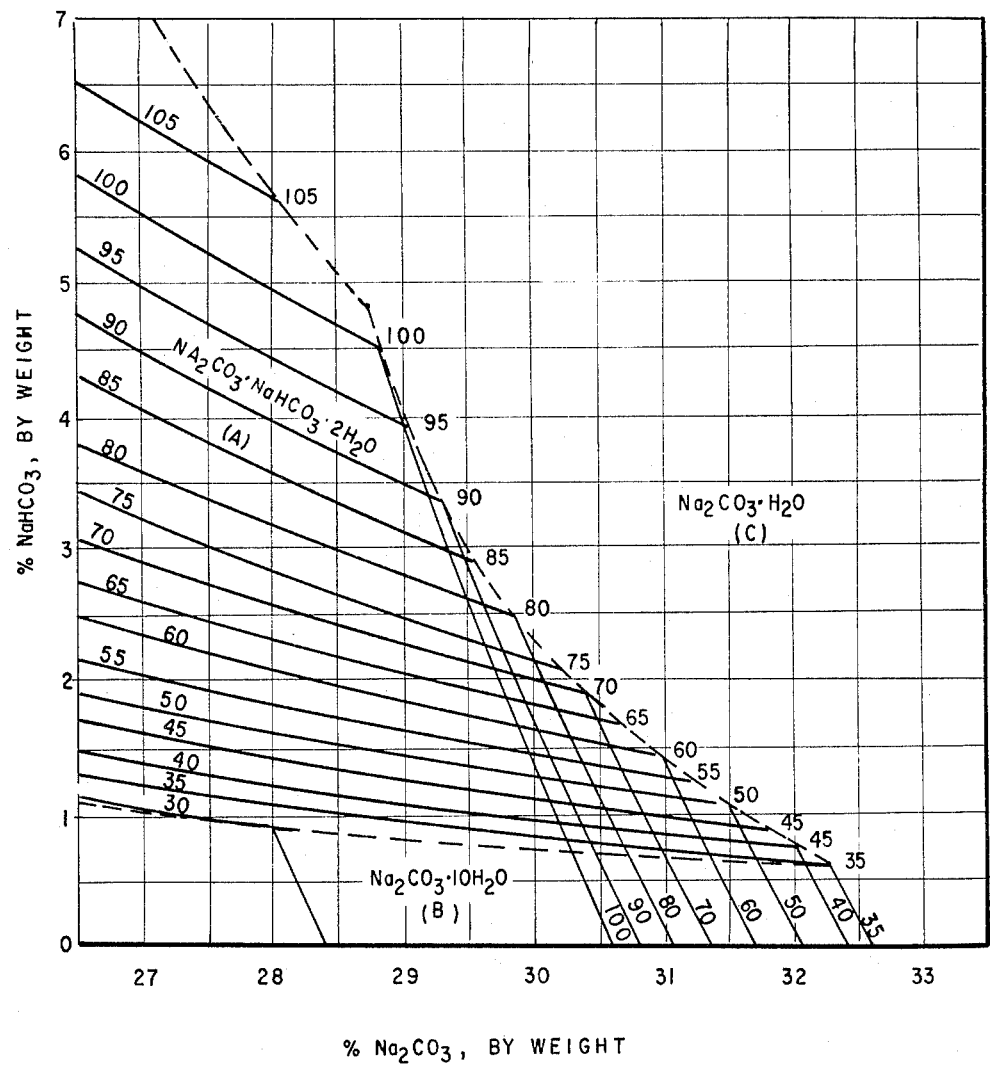

3,273,958
PROCESS FOR THE PREPARATION OF SODA ASH
Guy D. Peverley, Green River, Wyo., assignor to Intermountain Research & Development Corporation, Cheyenne, Wyo.
Filed Nov. 27, 1962, Ser. No. 240,279
4 Claims. (Cl. 23—63)

The invention relates to an improved process for the preparation of soda ash from deposits of trona as found in Sweetwater County, Wyoming, and other areas about the world.

The trona deposits in Sweetwater County are found at depths ranging from 800 to 2500 feet underground and consist of a main trona bed varying from 8 to 18 feet in thickness and other beds of varying thickness. The principal component of trona is sodium sesquicarbonate ($Na_2CO_3 \cdot NaHCO_3 \cdot 2H_2O$) with varying amounts of organic and inorganic impurities. A typical analysis of mined trona in Sweetwater County, Wyoming, is as follows:

| Constituent: | Percent |
|---|---|
| Sodium sesquicarbonate | 96.18 |
| NaCl | 0.03 |
| $Na_2SO_4$ | 0.01 |
| $Fe_2O_3$ | 0.11 |
| Insolubles | 3.67 |

Various processes for the production of soda ash from the sodium sesquicarbonate are known. In U.S. Patent No. 2,962,348, a purified soda ash is produced from crude trona by crushing the crude mined trona, calcining the crushed trona to form crude soda ash, dissolving the crude soda ash in water to form an aqueous solution of sodium carbonate, clarifying and filtering the said aqueous solution to remove insoluble material, heating and evaporating water from the said aqueous solution to form a slurry of sodium carbonate monohydrate crystals, separating the said crystals from the mother liquor, recycling the mother liquor to the evaporation step and calcining the sodium carbonate monohydrate crystals to dense soda ash. The process of this patent has the advantage that by dissolving the crude soda ash in water instead of recycled mother liquor only 2,000,000 gallons of solution are handled each day to produce 1,000,000 tons of soda ash per year as compared to the 7,000,000 gallons of solution handled by prior art processes such as in U.S. Patent No. 2,346,140. The smaller amount of solution to be handled results in savings in plant equipment and in lower heat requirements.

In heating and evaporating the filtered solution of sodium carbonate to form a slurry of sodium carbonate monohydrate crystals in mother liquor in the process of U.S. Patent No. 2,962,348, a scale of sodium carbonate monohydrate forms on the surfaces of the heat exchangers due to the inverse solubility of $Na_2CO_3$. The presence of the sodium carbonate monohydrate scale increases the heat requirements of the process and requires occasional halting of the process to remove the scale.

It is an object of the invention to provide an improved process for the preparation of soda ash from crude trona.

It is another object of the invention to provide an improved process for the preparation of soda ash from crude trona with little or no scale formation.

These and other objects and advantages of the invention will become obvious from the following detailed description.

The process of the invention comprises dissolving crude trona and crude soda ash in water to form an aqueous solution of sodium carbonate and sodium bicarbonate having a molar ratio of sodium carbonate to sodium bicarbonate greater than 1:1, clarifying and filtering the said aqueous solution, heating and evaporating water from the filtered solution to form a slurry of sodium carbonate monohydrate and sodium sesquicarbonate crystals, separating the said crystals from the mother liquor, recycling the mother liquor to the evaporation step, calcining the said crystals to soda ash and recovering the soda ash.

The aqueous solution of sodium carbonate and sodium bicarbonate can be formed in various ways. An aqueous solution of trona can be formed by circulating water through the underground trona formation, from wells drilled into the formation and crude soda ash prepared by calcination of crude trona can then be dissolved therein. An alternate procedure is to crush crude mined trona to a size of about ¼ inch, screen the crude trona, dissolve the smaller size trona in water to form an aqueous solution of sodium sesquicarbonate, calcine the large size trona to crude soda ash and dissolve the latter in the aqueous solution of sodium sesquicarbonate. It is preferable to dissolve the crude crushed trona in the water first rather than the crude soda ash because of the difference in dissolving rates.

Referring now to the drawings:

FIG. 1 is a portion of the phase diagram showing the solubility of sodium carbonate and sodium bicarbonate at various temperatures.

FIG. 2 is a flow diagram of one embodiment of the invention.

In FIG. 1 the area A is the sodium sesquicarbonate region wherein sodium sesquicarbonate is in equilibrium with an aqueous solution of $Na_2CO_3$ and $NaHCO_3$ at any point in area A. Area B is the sodium carbonate decahydrate region and area C is the sodium carbonate monohydrate region. The solid lines running from left to right in FIG. 1 are temperature isotherms which represent the composition of saturated aqueous solutions of sodium carbonate and sodium bicarbonate at the particular temperature. At the lower temperature the high temperature isotherms cross over the low temperature isotherms due to the inverse solubility of sodium carbonate.

The inverse solubility of sodium carbonate causes the formation of scale in the heat exchange equipment when evaporating solutions containing only sodium carbonate as in the process of U.S. Patent No. 2,962,348. When the solution in the evaporator is heated, the solution at the heat exchange surface becomes super saturated and the sodium carbonate monohydrate crystallizes on the heat exchange surface, thereby reducing the heat transfer rate. For example, if a solution of sodium carbonate saturated at 95° C. is heated to 100° C., 0.18 pound of sodium carbonate monohydrate crystals are precipitated for each 100 pounds of liquor heated while a solution of sodium carbonate and sodium bicarbonate will precipitate only about ¼ as much sodium carbonate monohydrate.

When water is evaporated from a solution of sodium carbonate and sodium bicarbonate with a composition represented by any point along the dotted line separating area A and area C at temperatures between 35 and 102° C., a mixture of sodium sesquicarbonate and sodium carbonate monohydrate crystals are formed. If the resulting crystal slurry is heated to a higher temperature, some sodium sesquicarbonate is dissolved and more sodium carbonate monohydrate crystals are formed. The liquor composition moves upward along the dotted line.

For example, upon heating an aqueous solution of sodium carbonate saturated at 95° C. to 100° C., 0.18 pound of sodium carbonate monohydrate would be deposited on the heat exchange equipment for each 100 pounds of liquor heated whether or not sodium carbonate monohydrate crystals are present in the solution. However, if a slurry of sodium carbonate monohydrate and sodium sesquicarbonate crystals in a mother liquor containing 29.05% sodium carbonate and 3.95% sodium bicarbonate (saturated at 95° C.) is heated to 100° C., 1.59 pounds of the sodium sesquicarbonate will dissolve due to its increase in solubility as the temperature increases and 0.95 pound of sodium carbonate monohydrate will precipitate due to the inverse solubility of sodium carbonate for each 100 pounds of liquor heated and the solution composition will be 28.8% sodium carbonate and 4.51% sodium bicarbonate. Although more sodium carbonate monohydrate is crystallized in this case than in the case of the sodium carbonate solution, only 0.045 pound of sodium carbonate monohydrate will be deposited on the heat exchange equipment or only about one-fourth of that deposited from a sodium carbonate solution. The remainder is crystallized from the solution as new particles or onto the surface of already formed sodium carbonate monohydrate crystals rather than on the surface of the heat exchange equipment. Therefore, the process can be operated on a plant scale for much longer periods of time before stopping of the process to clean the heat exchange equipment.

The heat requirements of the present invention are less than that required for the process of U.S. Patent No. 2,962,348. The following table compares the heat requirements of the two processes. The table shows that the process of the invention requires 33,400 B.t.u. less than the process of U.S. Patent No. 2,962,348 for each ton of soda ash produced.

of +40 mesh and —40 mesh. The —40 mesh trona is passed to dissolver 6 where it is dissolved in softened make-up water. The +40 mesh trona is passed by conveyor 7 to calciner 8 wherein the trona is calcined to form crude soda ash. The combustion products are passed by line 9 to cyclone 10 wherein the soda ash fines are separated from the gaseous products before the gaseous products are vented to the atmosphere by line 11. The crude soda ash is passed by line 12 to dissolver 14 and the soda ash fines from cyclone 10 are passed by line 13 to dissolver 14 wherein the crude soda ash is dissolved in the aqueous solution of sodium sesquicarbonate passed from dissolver 6 by line 15 to dissolver 14.

The ratio of sodium carbonate to sodium bicarbonate in the aqueous solution can be varied by changing the mesh size of the screen 4, by sending part of the —40 mesh crude trona to the calciner or by passing some of the +40 mesh crude trona from conveyor 7 to dissolver 6. The ratio of sodium carbonate to sodium bicarbonate must be greater than 1:1 and may be as high as 260:1 although a mole ratio between 2:1 and 22:1 is preferred.

The aqueous solution of sodium carbonate and sodium bicarbonate is passed from dissolver 14 by line 16 to clarifier 17 wherein the insoluble materials settle out. The settled insolubles are removed from clarifier 17 by line 18, are diluted with raw makeup water from line 19 and then fed into clarifier 20. The raw makeup water is softened by contact with the sodium carbonate in the insolubles and buildup of calcium deposits in the plant system is avoided and additional sodium sesquicarbonate is recovered from the insolubles. The solids are settled in clarifier 20 and discarded by line 21. The softened makeup water is passed by line 22 to dissolver 6 to dissolve the crude crushed trona.

The clarified solution from clarifier 17 is passed by line 23 to filter 24 to remove any additional solid materials and is then passed by line 25 to evaporator 26 wherein the solution is heated to evaporate water and form a slurry of sodium carbonate monohydrate and sodium sesquicarbonate crystals in mother liquor. The slurry of crystals and mother liquor is passed by line 27 to centrifuge 28 wherein the crystals are separated from the mother liquor. The mother liquor is recycled by line 29 to evaporator 26. If desired, a portion of the mother liquor may be purged by line 30 to control the amount of impurities such as sodium chloride and sodium sulfate in evaporator 26 and thus in the final soda ash product.

The sodium carbonate monohydrate and sodium sesquicarbonate crystals with some adhering mother liquor are passed from centrifuge 28 by conveyor 31 to calciner 32 where the crystals are calcined to soda ash which is removed by conveyor 33. The products of combustion

TABLE I

| Process | B.t.u. In Thousands Per Ton of Soda Ash | | | | |
|---|---|---|---|---|---|
| | Primary Calcination | Dissolving | Evaporation | Product Calcination | Total |
| U.S. Patent No. 2,962,348 | 1,823.8 | 29.2 | 4,056.4 | 1,120.6 | 7,030.0 |
| Present | 1,393.2 | 696.6 | 3,790.0 | 1,116.8 | 6,996.6 |

In the diagrammatic outline of the embodiment of the process shown in FIG. 2, crude trona ore is passed by conveyor 1 to crusher 2 where the trona ore is crushed to about ¼ inch in size. The crushed trona is then passed by conveyor 3 to screen 4 having a ¼ inch mesh. The trona larger than ¼ inch is then passed by conveyor 5 back to crusher 2 for further size reduction while the crushed trona less than ¼ inch is screened into fractions are passed by line 34 to cyclone 35 where the soda ash fines are separated from the gaseous products. The gaseous products are vented to the atmosphere by line 36 and the soda ash fines are added to the final product by line 37.

In the following table a material balance is shown for the production of 100,000 tons of soda ash by the process of FIG. 2.

TABLE II

Material Balance in Tons For 100,000 Tons of Soda Ash

|  | $Na_2CO_3$ | $NaHCO_3$ | $H_2O$ | $CO_2$ | Insoluble | Total |
|---|---|---|---|---|---|---|
| Crusher 2 | 68,335 | 54,346 | 23,194 |  | 16,188 | 162,063 |
| Screen 4 +40 mesh | 52,280 | 41,596 | 17,787 |  | 12,388 | 124,051 |
| Screen 4 −40 mesh | 16,055 | 12,750 | 5,407 |  | 3,800 | 38,012 |
| Calciner 8 | 78,555 |  |  |  | 12,388 | 90,943 |
| Vapors from Calciner 8 |  |  | 22,205 | 10,903 |  | 33,108 |
| Water to Dissolver 6 | 4,505 | 600 | 224,485 |  |  | 229,590 |
| Solution from Dissolver 14 | 99,115 | 13,350 | 229,825 |  | 16,188 | 358,478 |
| Underflow from Clarifier 17 | 4,840 | 650 | 11,200 |  | 16,188 | 32,878 |
| Underflow from Thickener 20 | 335 | 50 | 16,305 |  | 16,188 | 32,878 |
| Overflow from Clarifier 17 | 94,275 | 12,700 | 218,625 |  |  | 325,600 |
| Recycle Mother Liquor or to Evaporator 26 | 74,817 | 10,063 | 173,180 |  |  | 258,060 |
| Loss and Gain in Evaporator 26 | 2,412 | −3,822 | −190,373 | −1,000 |  | −192,783 |
| Sodium Carbonate Monohydrate Crystals in 30% Slurry | 81,608 |  | 13,852 |  |  | 95,460 |
| Sodium Sesquicarbonate Crystals In 30% Slurry | 10,381 | 8,244 | 3,555 |  |  | 22,180 |
| Purge 30 | 2,128 | 284 | 4,903 |  |  | 7,315 |
| Calciner 32 | 100,000 |  | 24,260 | 2,242 |  | 126,502 |

Various modifications of the process of the invention may be made without departing from the spirit or scope thereof and it is to be understood that the invention is to be limited only as defined in the appended claims.

I claim:

1. A process for the prepartion of soda ash from crude trona which comprises dissolving crude trona and crude soda ash in water to form an aqueous solution of sodium carbonate and sodium bicarbonate having a molar ratio of sodium carbonate to sodium bicarbonate greater than 1:1, clarifying and filtering the said aqueous solution to remove insolubles, heating and evaporating water from the filtered solution to form a slurry of sodium carbonate monohydrate and sodium sesquicarbonate crystals in mother liquor, separating the said crystals from the mother liquor, recycling the mother liquor to the evaporation step, calcining the said crystals to soda ash and recovering the soda ash.

2. A process for the prepartion of soda ash from crude trona which comprises dissolving crude trona and crude soda ash in water to form an aqueou solution of sodium carbonate and sodium bicarbonate having a molar ratio of sodium carbonate to sodium bicarbonate greater than 1:1, clarifying and filtering the said aqueous solution to remove insolubles, washing the insolubles with raw water to soften the water and recover additional sodium sesquicarbonate values, cycling the softened water to the dissolving step to dissolve the crude trona and crude soda ash, heating and evaporating water from the filtered solution to form a slurry of sodium carbonate monohydrate and sodium sesquicarbonate crystals in mother liquor, separating the said crystals from the mother liquor, recycling the mother liquor to the evaporation step, calcining the said crystals to soda ash and recovering the soda ash.

3. A process for the preparation of soda ash from crude trona which comprises dissolving crude trona and crude soda ash in water to form an aqueous solution of sodium carbonate and sodium bicarbonate having a molar ratio of sodium carbonate to sodium bicarbonate greater than 1:1, clarifying and filtering the said aqueous solution to remove insolubles, washing the insolubles with raw water to soften the water and recover additional sodium sesquicarbonate values, cycling the softened water to the dissolving step to dissolve the crude trona and crude soda ash, heating and evaporating water from the filtered solution to form a slurry of sodium carbonate monohydrate and sodium sesquicarbonate crystals in mother liquor, separating the said crystals from the mother liquor, purging a portion of the mother liquor to control the impurities in the soda ash products, recycling the mother liquor to the evaporation step, calcining the said crystals to soda ash and recovering the soda ash.

4. A process for the preparation of soda ash from crude trona which comprises crushing mined trona to less than one-quarter inch in size, screening the crushed trona into a fine portion and a coarse portion, dissolving the fine portion of trona in water, to form an aqueous solution of sodium sesquicarbonate, calcining the coarse portion of trona to crude soda ash, dissolving the crude soda ash in the aqueous solution of sodium sesquicarbonate to form an aqueous solution having a ratio of sodium carbonate to sodium bicarbonate greater than 1:1, clarifying and filtering the said aqueous solution to remove the insolubles, heating the said solution and evaporating water therefrom to form a slurry of sodium carbonate monohydrate and sodium sesquicarbonate crystals in a mother liquor, separating the said crystals from the mother liquor, recycling the mother liquor to the evaporation step, calcining the said crystals to soda ash and recovering the soda ash.

References Cited by the Examiner

UNITED STATES PATENTS 2,792,282   5/1957   Pike _____ 23—38
2,962,348   11/1960  Seglin et al. _____ 23—63 XR
3,119,655   1/1964   Frint et al. _____ 23—63

OSCAR R. VERTIZ, *Primary Examiner.*

MAURICE A. BRINDISI, *Examiner.*

G. T. OZAKI, *Assistant Examiner.*